United States Patent
Lewis

(10) Patent No.: US 9,661,717 B2
(45) Date of Patent: May 23, 2017

(54) MULTI-COLORED DISPLAY ILLUMINATION CONTROL FOR E-READING

(71) Applicant: Rakuten Kobo, Inc., Toronto (CA)

(72) Inventor: Damian Lewis, Toronto (CA)

(73) Assignee: RAKUTEN KOBO, INC., Toronto (CA)

( * ) Notice: Subject to any disclaimer, the term of this patent is extended or adjusted under 35 U.S.C. 154(b) by 60 days.

(21) Appl. No.: 14/231,143

(22) Filed: Mar. 31, 2014

(65) Prior Publication Data

US 2015/0282277 A1     Oct. 1, 2015

(51) Int. Cl.
*G06F 3/0483* (2013.01)
*H05B 33/08* (2006.01)
*H05B 37/02* (2006.01)
*G09G 5/00* (2006.01)

(52) U.S. Cl.
CPC ......... *H05B 33/0872* (2013.01); *G09G 5/003* (2013.01); *H05B 37/0218* (2013.01); *G09G 2360/144* (2013.01); *G09G 2380/14* (2013.01); *Y02B 20/46* (2013.01)

(58) Field of Classification Search
None
See application file for complete search history.

(56) References Cited

U.S. PATENT DOCUMENTS

| | | | | |
|---|---|---|---|---|
| 8,545,035 B1* | 10/2013 | Beguin | ................ | G09G 3/3413 345/102 |
| 8,933,916 B1* | 1/2015 | Doar | ................... | G09G 3/3406 345/207 |
| 2007/0124672 A1* | 5/2007 | Cragun | ............. | G06F 17/30716 715/234 |
| 2009/0172558 A1* | 7/2009 | Pickens | ................. | G06F 17/241 715/741 |
| 2010/0123597 A1* | 5/2010 | Kitsukawa | ............ | G06F 1/1626 345/173 |
| 2013/0117702 A1* | 5/2013 | Jang | ...................... | G06F 3/0483 715/776 |
| 2014/0062939 A1* | 3/2014 | Zehner | ..................... | G02B 6/00 345/174 |
| 2015/0185982 A1* | 7/2015 | Hicks | .................... | G06F 3/0483 715/776 |

FOREIGN PATENT DOCUMENTS

JP     2006331094 A     * 12/2006     ............ G06F 17/30

OTHER PUBLICATIONS

Espacenet translation of JP2006331094A.*

* cited by examiner

*Primary Examiner* — Amr Awad
*Assistant Examiner* — Donna Lui
(74) *Attorney, Agent, or Firm* — Oblon, McClelland, Maier & Neustadt, L.L.P.

(57) ABSTRACT

A computing device that includes a programmatically controlled front light. The front light cast light onto a display surface and/or other region of the computing device, for purpose of providing illumination and/or lighting effect.

20 Claims, 6 Drawing Sheets

MULTI-COLORED DISPLAY ILLUMINATION CONTROL FOR E-READING

TECHNICAL FIELD

Examples described herein relate a system and method for controlling illumination provided onto a display of a computing device.

BACKGROUND

An electronic personal display is a mobile electronic device that displays information to a user. While an electronic personal display may be capable of many of the functions of a personal computer, a user can typically interact directly with an electronic personal display without the use of a keyboard that is separate from or coupled to but distinct from the electronic personal display itself. Some examples of electronic personal displays include mobile digital devices/tablet computers such as (e.g., Apple iPad®, Microsoft® Surface™, Samsung Galaxy Tab® and the like), handheld multimedia smartphones (e.g., Apple iPhone®, Samsung Galaxy S®, and the like), and handheld electronic readers (e.g., Amazon Kindle®, Barnes and Noble Nook®, Kobo Aura HD, and the like).

An electronic reader, also known as an e-reader, is an electronic personal display that is used for reading electronic books (eBooks), electronic magazines, and other digital content. For example, digital content of an eBook is displayed as alphanumeric characters and/or graphic images on a display of an e-reader such that a user may read the digital content much in the same way as reading the analog content of a printed page in a paper-based book. An e-reader provides a convenient format to store, transport, and view a large collection of digital content that would otherwise potentially take up a large volume of space in traditional paper format.

In some instances, e-readers are purpose built devices designed especially to perform especially well at displaying readable content. For example, a purpose built e-reader may include a display that reduces glare, performs well in high light conditions, and/or mimics the look of text on actual paper. While such purpose built e-readers may excel at displaying content for a user to read, they may also perform other functions, such as displaying images, emitting audio, recording audio, and web surfing, among others.

There also exists numerous kinds of consumer devices that can receive services and resources from a network service. Such devices can operate applications or provide other functionality that links the device to a particular account of a specific service. For example, e-reader devices typically link to an online bookstore, and media playback devices often include applications which enable the user to access an online media library. In this context, the user accounts can enable the user to receive the full benefit and functionality of the device.

DETAILED DESCRIPTION

Figure 1:
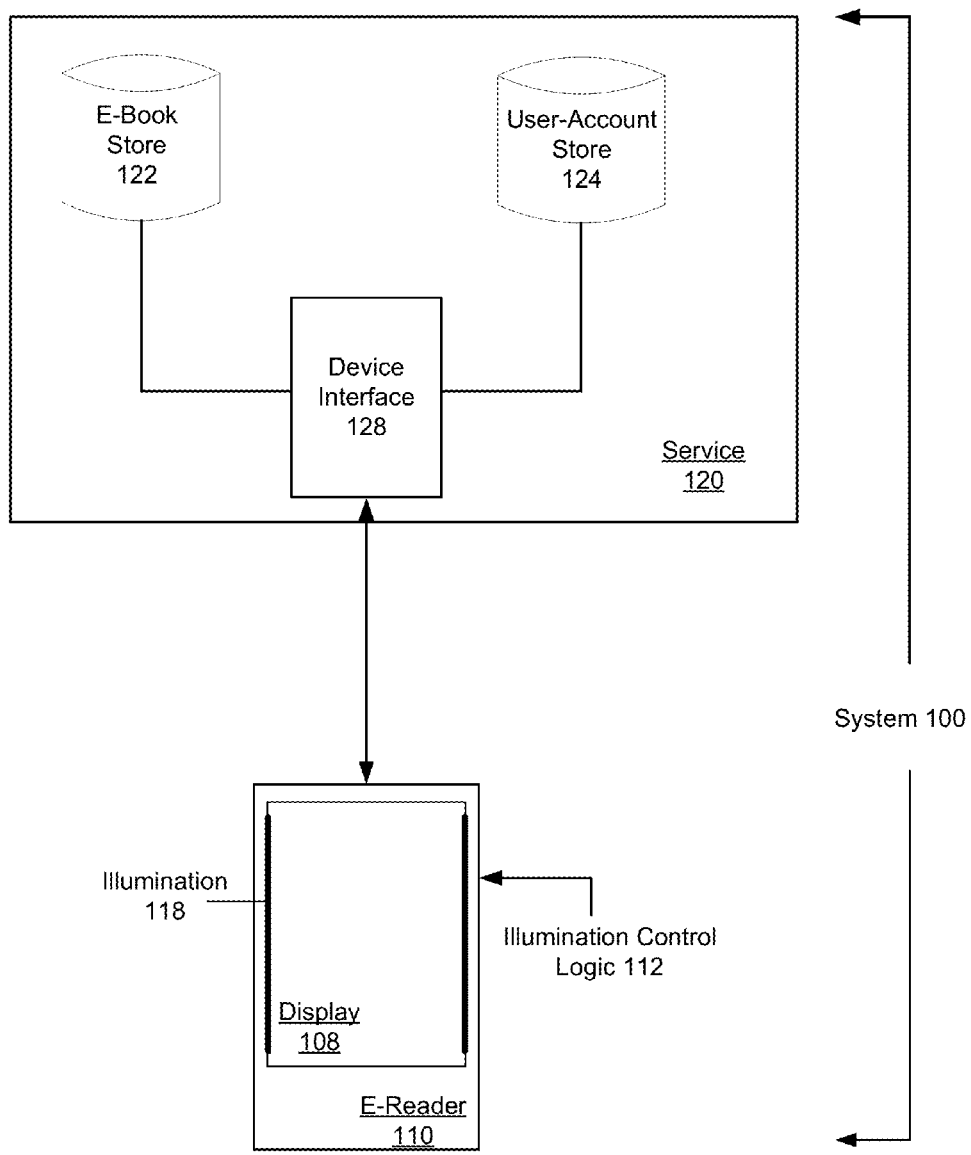
FIG. 1 illustrates a system for operating a computing device to enhance electronic reading activity, according to an embodiment.

Examples described herein include a computing device that is able to control the illumination of a display surface of the computing device, separate and independent of content outputted by the display device. In particular, some examples provide for a computing device that includes a programmatically controlled front light. The front light cast light onto a display surface and/or other region of the computing device, for purpose of providing illumination and/or lighting effect. Examples described herein provide for a computing device that can programmatically control changes in the state of a front light component, including control of changes to color, luminosity, and/or lighting effect.

Still further, in some embodiments, a computing device is operable to detect one or more pre-determined illumination triggers for a front light of the computing device. A state for the front light is selected based on the detected one or more pre-determined illumination triggers, and the front light is controlled to change into the selected state.

According to an embodiment, a computing device includes a housing, a display screen, a multi-colored set of illumination elements provided over the display screen, a memory that stores a set of instructions, and one or more processors that use the instructions stored in the memory. The one or more processors render content from an e-book on the display screen, and detect one or more pre-determined illumination triggers. In response, the one or more processors select a color based on the detected one or more pre-determined illumination triggers. The display screen can be illuminated in the selected color using the mufti-colored set of illumination elements.

Still further, in some embodiments, the one or more processors trigger illumination of the of the multi-colored set of illumination elements in at least a first color at a first instance, and illumination of the mufti-colored set of illumination elements in at least a second color at a second instance.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System and Device Description

FIG. 1 illustrates a system for operating a computing device to enhance electronic reading activity, according to an embodiment. In an example of FIG. 1, system 100 includes an electronic display device, shown by way of example as an e-reader device 110, and a network service 120. The network service 120 may include multiple servers and other computing resources that provide various services in connection with one or more applications that are installed on the e-reader device 110. By way of example, in one implementation, the network service 120 can provide e-book services which communicate with the e-reader device 110. The e-book services provided through network service 120 can, for example, include services in which e-books are sold, shared, downloaded and/or stored. More generally, the network service 120 can provide various other content services, including content rendering services (e.g., streaming media) or other network-application environments or services.

The e-reader device 110 can correspond to any electronic personal display device on which applications and application resources (e.g., e-books, media files, documents) can be rendered and consumed. For example, the e-reader device 110 can correspond to a tablet or a telephony/messaging device (e.g., smart phone). In one implementation, for example, e-reader device 110 can run an e-reader application that links the device to the network service 120 and enables e-books provided through the service to be viewed and consumed. In another implementation, the e-reader device 110 can run a media playback or streaming application which receives files or streaming data from the network service 120. By way of example, the e-reader device 110 can be equipped with hardware and software to optimize certain application activities, such as rendering of electronic content (e.g., e-books). For example, the e-reader device 110 can have a tablet like form factor, although variations are possible. In some cases, the e-reader device 110 can also have an E-ink display.

In additional detail, the network service 120 can include a device interface 128, a resource store 122 and a user account store 124. The user account store 124 can associate the e-reader device 110 with a user and with an account 125. The account 125 can also be associated with one or more application resources (e.g., e-books), which can be stored in the resource store 122. As described further, the user account store 124 can retain metadata for individual accounts 125 to identify resources that have been purchased or made available for consumption for a given account. The e-reader device 110 may be associated with the user account 125, and multiple devices may be associated with the same account. As described in greater detail below, the e-reader device 110 can store resources (e.g., e-books) that are purchased or otherwise made available to the user of the e-reader device 110, as well as to archive e-books and other digital content items that have been purchased for the user account 125, but are not stored on the particular computing device.

With reference to FIG. 1, the e-reader device 110 includes a housing 106 that includes a display screen 108 on which text content from selected e-books can be rendered. The e-reader device 110 also includes a separate or independent illumination component 118 for the display screen 108. In some examples provided herein, the illumination component 118 is provided as a front light, which directs light onto the display surface 108 from a housing bezel or thickness.

Figure 2A:
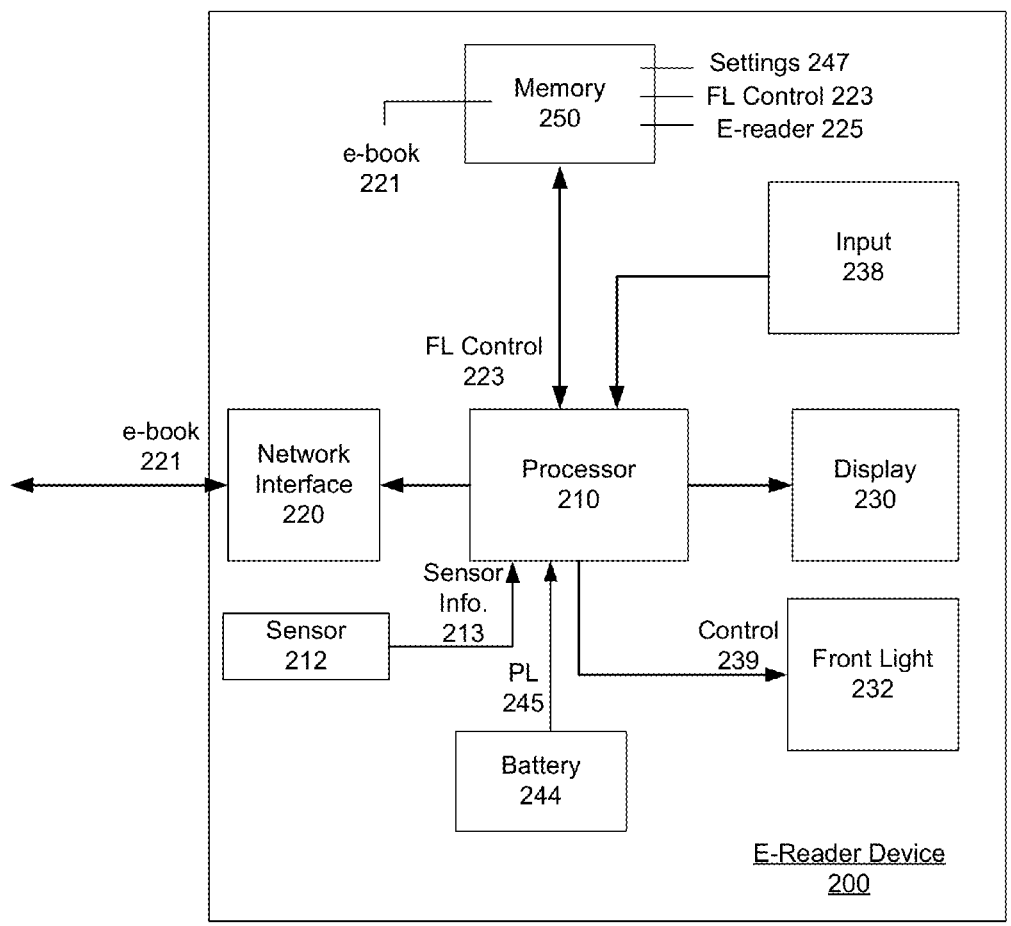
FIG. 2A illustrates an example of an e-reader device or other electronic personal display device, for use with one or more embodiments described herein.

As described in example of FIG. 2A, the display area 108 can be configured as a touch sensitive component of a display assembly on which input features are provided or are otherwise enabled. By way of example, the input features can include soft buttons or hidden touch regions where the user can transition pages from an e-book, looking words up (using a dictionary function).

According to some examples, the illumination component 118 independently illuminates the display screen 108 in order to create a visual effect. The visual effect can correspond to, for example, illuminating an otherwise non-illuminated screen (such as provided by electronic paper type displays). The illumination can further be provided with characteristics, such as luminosity, color, and and/or other lighting effects.

The e-reader device 110 can include illumination control logic 122 that controls one or more illumination aspects of the front light 118. As described with examples, the control logic 122 can control one or more of the color, the luminosity, lighting affect (e.g., blinking or modulation), or other illumination characteristic. Furthermore, in some variations, the control logic 122 controls the illumination component 118 in a manner that is responsive to triggers. As described with various examples, the illumination component 118 can be responsive to software-implemented triggers, sensor implemented triggers, and/or hardware component related triggers. Additionally, the illumination component 118 can be responsive to settings and/or input provided by a user through interaction with the-reader device 110. As described with examples, the control logic 122 controls the lighting aspects of the illumination component 118 while the display screen 108 is used to render content, such as pages of an e-book. In this way, the illumination component 118 can generate ambience, illumination environment, and/or status information independently of content displayed on the display screen 108.

In one implementation, the illumination component 118 is provided in the form of light emitting diodes (LEDs) or other discrete light sources that are disposed in a housing 106 of the e-reader device 110. The front light 118 can be programmatically controllable to modulate in color, luminosity and/or affect. The orientation of the illumination component 118 directs light onto the display screen 108 independent of content rendered through the display screen. As shown with examples of FIG. 2B and FIG. 2C, the light sources that comprise the illumination component 118 can be disposed in a bezel of the housing 106 so as to cast light on to the display screen 108.

Hardware Description

FIG. 2A illustrates an example of an e-reader device or other electronic personal display device, for use with one or more embodiments described herein. In an example of FIG. 2A, an e-reader device 200 can correspond to, for example, a device, such as also shown by an example of FIG. 1. With reference to FIG. 2A, e-reader device 200 includes a processor 210, a network interface 220, a display 230, a front light 232, one or more input mechanisms 240, and a memory 250.

The processor 210 can implement functionality using instructions stored in the memory 250. Additionally, in some implementations, the processor 210 utilizes the network interface 220 to communicate with the network service 120 (see FIG. 1). More specifically, the e-reader device 200 can access the network service 120 to receive various kinds of resources (e.g., digital content items such as e-books, configuration files, account information), as well as to provide information (e.g., user account information, service requests etc.). For example, e-reader device 200 can receive application resources, such as e-books 221 or media files that the user elects to purchase or otherwise download from the network service 120. The application resources that are downloaded onto the e-reader device 200 can be stored in the memory 250.

In some implementations, the display 230 can correspond to, for example, a liquid crystal display (LCD) or light emitting diode (LED) display that illuminates in order to provide content generated from processor 210. In some implementations, the display 230 can be touch-sensitive. In some variations, the display 230 can correspond to an electronic paper type display, which mimic conventional paper in the manner in which content is displayed. Examples of such display technologies include electrophoretic displays, electrowetting displays, and electrofluidic displays.

The front light 232 provides an example of illumination component 118 (see FIG. 1). In the example provided, the front light 232 is optically coupled to the display screen of the display 240 in order to independently illuminate the displays screen of the display 240. The front light 232 can be implemented using a variety of different light sources, including a set of one or more miniaturized or discrete light sources such as light emitting diodes (LEDs). In one implementation, the front light 232 can be composed of a set of one or more multicolored LEDs, such as red-green-blue-white (RGBW) LEDs.

The processor 210 can receive input from various sources, including from input mechanisms 240 (e.g., buttons or switches, microphone, keyboard), and/or the display 230 (e.g., soft buttons or keyboard) or other input mechanisms (accessory devices). The processor 210 can further communicate with the display 240 in order to render content onto a display screen of the display 240. The processor 210 can also send control signals 239 to the front light 232, for purpose of controlling the state of the front light 232 in casting light onto the display screen of the display 240.

The memory 250 can store instructions 223 for implementing the illumination control logic 112 (see FIG. 1) ("front light control instructions 223"). The memory 250 can also store e-books 221, including e-books that can be, for example, downloaded from the network service 120 (see FIG. 1). The processor 210 can execute front light control instructions 223 in order to control the front light 232. In one implementation, the front light control instructions 223 provide for the processor 210 to be responsive to conditions or events in controlling operation and/or lighting characteristics of the front light 232. In particular, the front light control instructions 223 can provide for the processor 210 to be responsive to (i) software implemented events, such as triggers embedded or otherwise integrated with processes for rendering e-books, (ii) external events or conditions, such as environmental conditions, and/or (iii) hardware events, such as generated by hardware components of the e-reader device 200.

With regard to software implemented events, memory 250 can store, by way of example, instructions 225 for implementing an e-reader or other functionality of the e-reader device 110. The instructions 225 can include or be associated with one or more triggers that cause the processor 210 to generate the control signals 239 for the front light 232. As described herein, the triggers can specify events or conditions in which the processor 210 is to generate the control signals 239. Additionally, the instructions 225 can include data to correlate triggers with the state of the front light 232. The state of the front light 232 can determine aspects such as color, luminosity and/or affect.

In some variations, the processor 210 communicates with one or more sensors 212 to obtain sensor information 213 that identifies, for example, external events or conditions. For example, the sensor 212 can correspond to a light sensor that detects ambient light conditions. The front light instructions 223 can further enable the processor 210 to control the illumination level and/or color of the front light 232 based on sensor information 213, such as the determined ambient light conditions. As another example, the sensor 212 can correspond to a temperature sensor that detects the temperature of the external environment. In such a variation, processor 210 can use the front light control instructions 223 to control the illumination level and/or color of the front light based on the detected temperature.

In some implementations, the processor 210 can interface with hardware components in order to determine information such as the operational status of individual components. By executing the front light control instructions 223, a change in the operational status of a hardware component can be detected as an event that results in the processor 210 signaling the control signals 230 to the front light 232. As an addition or variation, the processor can interface with the battery 244 of the computing device 200 in order to detect a power level 245 of the battery. In such an implementation, the processor 210 can use the front light control instructions 223 to control the illumination level, modulation, and/or color of the front light 232 based on the power level 245 of the battery 240.

Still further, the memory 250 can store user-defined settings or conditions 247 that can separately trigger the processor 210 and the manner that the front light 232 is controlled. For example, user settings 247 can specify conditions or otherwise configure front light control instructions 223 to determine events or conditions when the front light 232 is to be utilized. As an addition or alternative, the user-defined settings 247 can specify the illumination characteristics that are to be generated by the front light 232, including for specific events or conditions. For example, the user can define settings 247 so that the front light 232 illuminates a particular color by default, and/or changes color or illumination pattern in response to an environmental conditions such as an ambient light condition.

Front Light

Figure 2B:
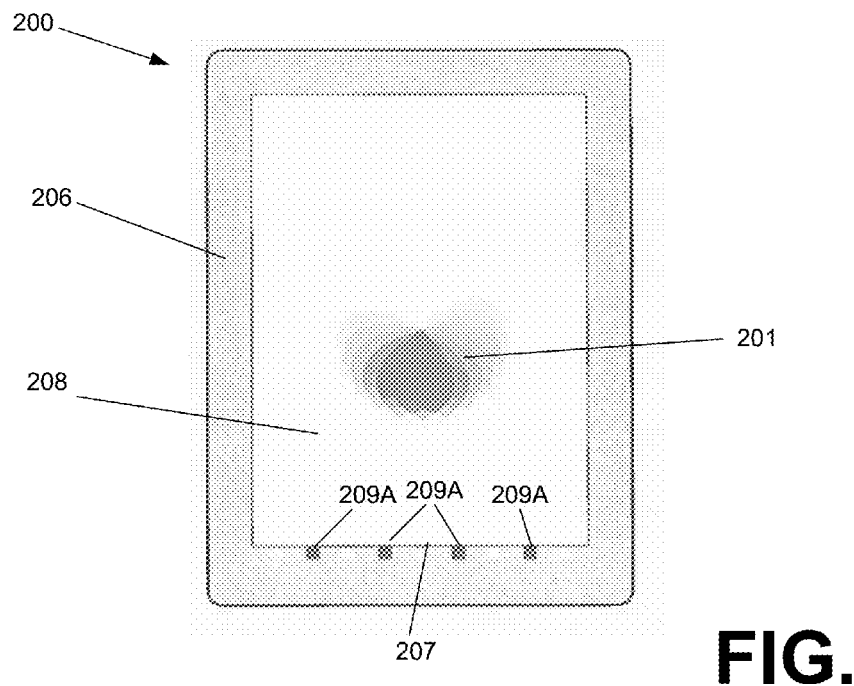
FIG. 2B and FIG. 2C illustrate alternative examples of e-reader device having a front light in accordance with one or more embodiments.
Figure 2C:
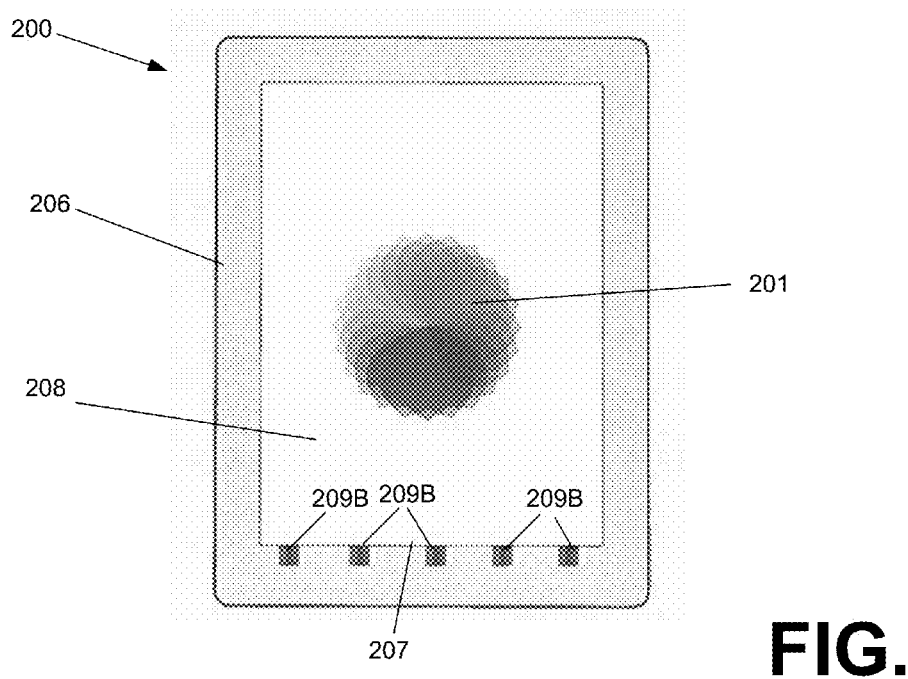

FIG. 2B and FIG. 2C illustrate alternative examples of e-reader device 200 having a front light in accordance with one or more embodiments. In more detail, the e-reader device 200 of FIG. 2B and FIG. 2C can include housing 206 for supporting the display screen 208. The display screen 208 can form the exterior surface of the display 240 (see FIG. 2A). For example, in the context of e-paper type displays, the display screen 208 can provide a visual interface for the reader, and content provided through the display surface 208 can be non-illuminated.

The housing 206 provides a bezel 207 which surrounds the display screen 208 and provides a thickness relative to the display screen 208. The bezel 207 can provide structure for supporting discrete light sources. For example, a set of LEDs 209A (FIG. 2B), 209B (FIG. 2C) can be at least partially disposed within the bezel 207 to direct light 201 onto the display screen 208.

In examples of FIG. 2B and FIG. 2C, the LEDs 209A, 209B can be operable in multiple states (e.g., on/off, blinking, patterned blinking), and/or multiple luminosity states (e.g., dim/bright). Additionally, in an example of FIG. 2C, the LEDs 209B are multicolored, so as to be illuminatable in multiple colors. For example, the LEDs 209B can correspond to RGBW LEDs that generate illumination for the display screen 208 in one of multiple colors. The state and/or color of the LEDs 209A (FIG. 2B), 209B (FIG. 2C) can be determined by control of the processor 210 (see FIG. 2A). In particular, as described with some examples, the processor 210 can identify events and/or conditions would trigger changes in the state of the LEDs 209A, 209B.

Device System

Figure 3:
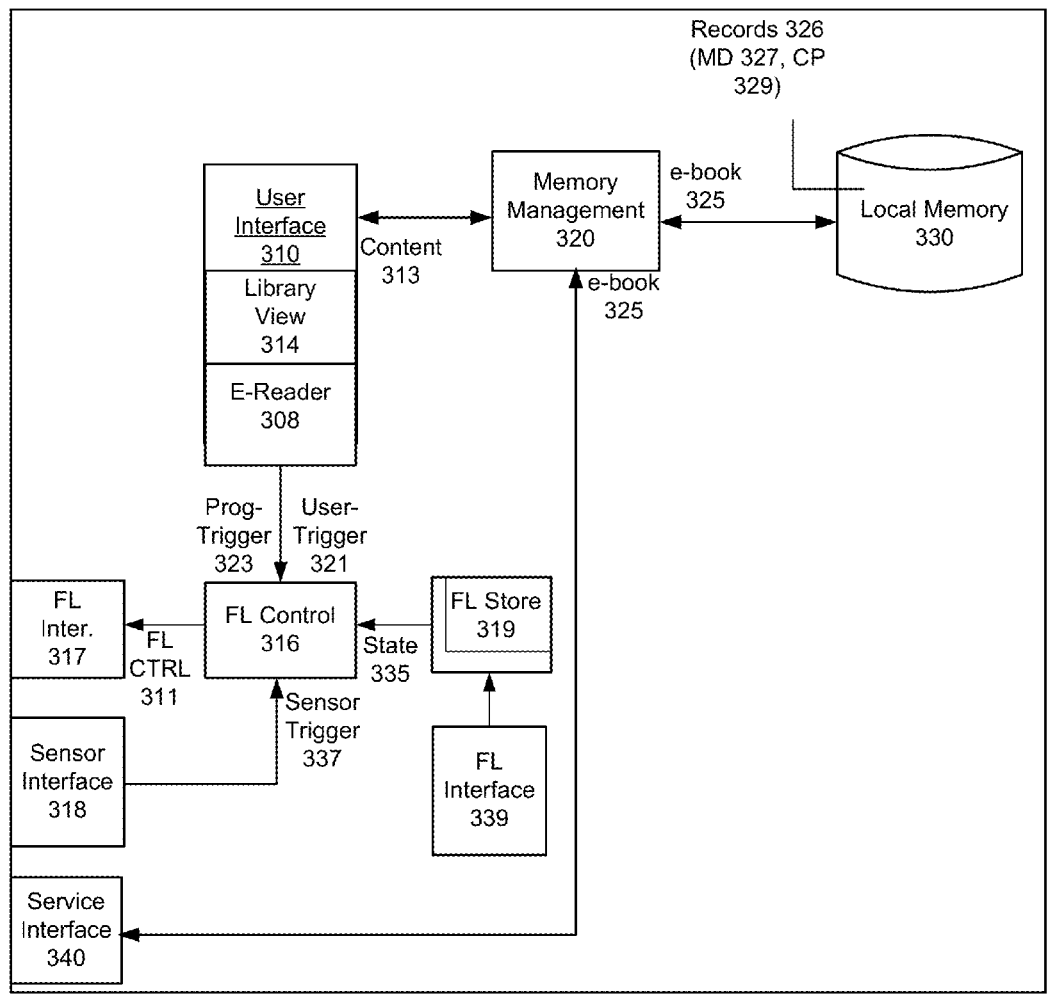
FIG. 3 illustrates an example device system for providing illumination onto a display screen of an e-book device, according to one or more embodiments.

FIG. 3 illustrates an example device system for providing illumination onto a display screen of an e-book device, according to one or more embodiments. In reference to FIG. 3, a device system 300 implements programmatic components for communicating with an e-book service (such as network service 120, shown in FIG. 1), as well as for enabling functionality for viewing and accessing e-books utilized by an account associated with the e-reader device 110 (see FIG. 1 or FIG. 2). In some embodiments, the device system 300 can be implemented as an application that runs on an e-reader device, such as shown with examples of FIG. 1 or FIG. 2A through FIG. 2C.

In an example of FIG. 3, system 300 includes a user interface 310, a memory management module 320, a local memory 330, and a service interface 340. Some or all of the programmatic components shown with the computing system 300 can be provided in part as operating system-level components. Alternatively, the programmatic components shown with the device system 300 can be provided as part of an application that runs on, for example, the e-reader device 110. For example, the user can download an application onto the device that is operated as the e-reader device 110, in order to obtain functionality such as described with an example of FIG. 3. Alternatively, an application can be embedded or otherwise preinstalled with other programmatic elements for providing functionality such as described with system 300.

The service interface 340 includes application logic which enables the e-reader device 110 to use, for example, a wireless Internet connection, to connect to the network service 120 (see FIG. 1). In connecting with the service, the service interface 340 can transmit data that enables the network service 120 to identify the e-reader device 110 on which system 300 is implemented, so that the network service 120 can determine the account that is associated with the particular e-reader device. The service interface 340 can be used to retrieve e-books 325 from the network service 120. For example, in identifying the e-reader device 110 of system 300 to the network service 120, the network service may be able to procure payment information (e.g., stored credit card information) that can be used to charge the users account when the user purchases a new e-book from the service. Each e-book can correspond to a literary work having a pagination format. Optionally, some e-books may have chapter designations, as well as content that corresponds to graphics or images (e.g., such as in the case of magazines or comic books). Individual e-books 325 can also include metadata 327, such as imagery provided as a cover for the e-book when the e-book is marketed (e.g. similar to the manner in which a conventional hardbound book would be marketed in a retail store). In one implementation, the network service 120 can retrieve or otherwise identify the imagery and other metadata 327 of individual e-books from publisher sources.

In identifying the e-reader device of system 300, the network service 120 can identify what e-books belong to the account associated with the particular device. The e-books that are transmitted to the e-reader device of system 300 include those e-books that are purchased from the device, or those e-books that the user requested to download. In variations, e-books can be automatically downloaded to the device in response to occurrence of certain conditions. For example, the user can purchase an e-book on another device, and then subsequently connect to the network service 120 via the e-reader device 110 to automatically receive their previously purchased e-book. Alternatively, as another example, network service 120 can be configured to push e-books to the e-reader device 110 of system 300, based on, for example, user account settings, subscription plans and rules, and various other business logic considerations.

Additionally, the service interface 340 can include processes for automatically receiving updates from a network service 120. The update can include programmatic updates, including updates to software components on the e-book device 110, as well as updates to lists, download of e-books that the user may have purchased on another device of the same account, recommendations from the network as to what a given user may want to purchase or view, and/or various other data that can be either generally provided to the user of the network service or specifically provided for to the particular account or user.

According to some embodiments, the local memory 330 stores each e-book as a record 326 that includes metadata 327 and content 329 (e.g., page content). The management module 320 can retrieve portions of individual e-books for purpose of rendering e-books via the user interface 310.

In an example of FIG. 3, the user interface 310 of device system 300 includes an e-reader component 308 and a library view component 314. The e-reader component 308 displays content from a given e-book of the user selection via the memory management 320 and/or local memory 330. For example, the e-reader component 308 can display content 313 (e.g., one or more pages of) content portion 329 of a given e-book 325. The e-reader component 308 can include features to enable the user to perform actions such as the page turning, chapter turning, page turning by clusters, scanning, and/or searching. As additional examples, the e-reader component 308 can provide features for enabling the user to adjust settings (e.g., brighten or dim display), annotate or highlight, perform a dictionary lookup or translation, and/or share or perform social networking activities. In response to input provided by the user, the e-reader component 308 can update the content 313 that is displayed. For example, in response to a page or chapter turn input, the e-reader component 308 can retrieve and update content 313 (via the memory management 320) from the memory 330, and further output the updated content for display on the device for system 300.

The library view 314 can display objects representing e-books and other content items for the user. In one implementation, the library view 314 displays metadata content, corresponding to images and/or text associated with the metadata 327 of the e-book 325 that is being displayed. For example, the library view 314 can display book cover images and author information for the e-books that are in the user library. The library view 314 can also display metadata for e-books that are provided from network service 120 (see FIG. 1) and/or which are in the user library, but not stored locally (e.g., archived e-books).

The user interface 310 can be coupled to a front light control component 316. The front light control component 316 includes instructions and other logic for controlling the front light of the device on which system 300 is implemented. In the example provided, the front light control 316 is coupled to an interface 317 for front lights. By way of example, the interface 317 can be used to signal front lights 209A or 209B, as shown with examples of FIG. 2B and FIG. 2C. The interface 317 can be used to signal changes to the state of front lights of the device for system 300. In one implementation, the front light component 316 signals control 311 to the front light interface 317. The front light control 311 can cause the interface 317 to change an existing state (e.g., illumination level, color etc.) of the front light, and further to specify one or more future states of the front lights.

In some variations, front light control component 316 can include user-interface features that are displayed via the user interface 310. For example, the front light control component 316 can include features that are displayed via the e-reader component 308 and/or library view 314. One or more such features can enable the user to provide input that signals a user-trigger 321 to the front light control component 316. The user-trigger 321 can be signaled to the front light control component 316 to change the state of the front lights while, for example, the user is viewing content 313 that is provided through the e-reader component 308. The user-trigger 321 can specify a state for the front light. More specifically, input corresponding to user-trigger 321 can specify the state for the front light. For example, the user-trigger 321 can specify that illumination level, color and/or lighting pattern of the front light. By way of example, the user can view a page of an e-book 325 via the e-reader 312, then select a front light feature that enables the user to specify a color (e.g., blue) and/or brightness for the front light.

In variations, a programmatic trigger 323 can be generated from functionality provided through, for example, user interface 310. In one implementation, the e-reader component 308 pre-associates triggers with aspects of the e-book that is being rendered. The programmatic trigger 323 can correlate to events or conditions, such as (i) a particular page being rendered, (ii) a proportion of the e-book that has been completed (e.g., viewed), (iii) an e-book activity that has been performed by the user (e.g., hold page while transitioning pages), (iv) a particular word or phrase that has been selected, and/or (iv) a subject matter (as identified by words or phrases) in the content 313 being displayed. Still further, in variations, the e-reader component 308 can detect an event or condition corresponding to the programmatic trigger 323, such as (i) the user selecting a particular e-book that is designated for a particular front light affect (e.g., by user input or default), (ii) the user providing input for turning a page (e.g., the user completes 50% of the e-book with the page turn), (iii) the user providing input for highlighting a word, or (iv) the e-reader component 308 being operated to render a particular page that is designated to have a specific or different front lighting affect (e.g., by user-specified input or by default). In this way, the programmatically generated trigger 323 can be signaled from the user interface 310 to the front light control component 316 when an underlying event or condition of the trigger occurs.

Likewise, the library view 314 can provide sources for generating programmatic trigger 323. For example, input provided by the user to view a particular library (e.g., archive library, displaying e-books which are stored on the network service 120 (See FIG. 1)) can be associated with a corresponding programmatic trigger 323. When, for example, the user views an archive library, the front light component 316 can be controlled to illuminate in a particular color. The color selection can, for example, indirectly inform the user that the e-books being shown are stored on the network, and not on the device at the particular instance.

In some implementations, each of the user-trigger 321 and programmatic trigger 323 can be provided or otherwise associated with characteristics such as identifiers or other data elements. The characteristics of the triggers 321, 323 can define the state of the front light components. For example, the user-trigger 321 or programmatic trigger 323 can include data that identifies, or is correlative to, a particular color, illumination state, effect (e.g., blinking) or other lighting characteristic.

As an alternative or addition, one implementation provides that the front light control component 316 includes a front light data store 319 that correlates triggers 321, 323 (or data elements provided with the triggers 321, 323) with specific lighting characteristics that the define the state 335 of the front lights (e.g., as provided with LEDs 209A, 209B shown by FIG. 2B and FIG. 2C). The front light data store 319 can be based on rules or other logic that are provided with the control component 316.

In some variations, at least some of the data provided with the front light data store 319 can be user-specified. In one implementation, for example, a control interface 329 can be provided for the front light data store 319 to enable the user to provide input corresponding to settings or configurations which identify the programmatic trigger 323, as well as the resulting state (or change in state) of the front lights. The identifiers and/or other data elements provided with the user-trigger 321 and/or programmatic trigger 323 can be correlated to the front light data store 319 to identify the particular state or change in state of the front lights.

In some variations, the front light data store 319 includes settings that are specified by the user and implemented independently of programmatic triggers 323. For example, the user may specify conditions during which front light component 316 is to control the front light components (e.g., LEDs 209A, 209B of FIG. 2B or FIG. 2C) to illuminate with one or more specific characteristics. As a first example, the user may specify by default that the front light is to always illuminate in a particular color. As another example, the user may specify a schedule that determines the default state of the front light, based on time of day.

The front light control component 316 signal front light control 311 to interface 317 in order to implement the change in state for the front lights. The front light interface 317 can signal the output state to the front light components, such as provided by LEDs 209A, 209B (see FIG. 2B and FIG. 2C).

In some variations, the front light component 316 can receive sensor readings 327, which can correspond to or be interpreted as triggers based on predetermined threshold values. The sensor readings 327 can be provided by a sensor interface 318. The sensor interface 318 can include logic that interfaces with hardware sensors provided on, for example, an exterior of the housing for the device of system 300. By way of example, hardware sensors can correspond to ambient light sensors and or temperature sensors. Thus, the temperature sensor can obtain the temperature of the environment for the e-book device used by system 300. Likewise, a light sensor can determine the illumination level in the environment of the device for system 300. The front light control component 316 can interpret sensor triggers from values provided in the sensor readings 327, such as values for temperature and/or ambient luminosity.

In one implementation, sensor readings 327 can cause the front light control component 316 to signal control 311 to the front light interface 317, in order to alter the state of the front light components (e.g., LEDs 209A, 209B as shown by FIG. 2B and FIG. 2C). The front light control component 316 can correlate information provided in the sensor readings 327 with the state of the front light components, using, for example, front light data store 319. For example, the front light data store 319 can correlate specific sensor readings to a particular state of illumination.

In some variations, the user can define what the state of the front light should be in response to certain sensor values provided in the sensor readings 327. The user defined responses can be provided through the front light interface 329. The user can specify, for example, the ambient light value or temperature value that is to trigger a particular illumination state.

Methodology

Figure 4:
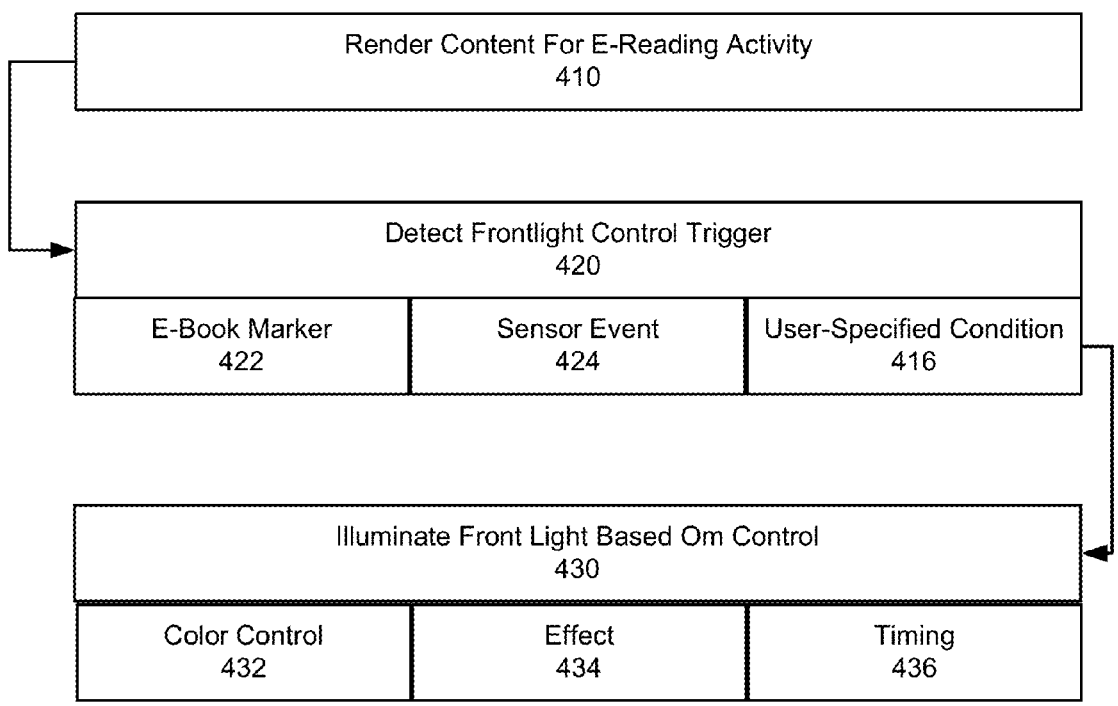
FIG. 4 illustrates an example method for controlling a state of an illumination component that is provided to cast light onto a display surface of an e-reader device, according to an embodiment.

FIG. 4 illustrates an example method for controlling a state of an illumination component that is provided to cast light onto a display surface of an e-reader device, according to an embodiment. An example method such as provided by FIG. 4 can be implemented using components such as described with examples of FIG. 1, FIG. 2A, FIG. 2B, FIG. 2C, or FIG. 3. Accordingly, reference may be made to elements of other figures for purpose of illustrating a suitable component for performing a step or sub step being described.

With reference to FIG. 4, e-reader device 110 can render content for the reading activity (410). For example, the e-book device 110 can render content corresponding to a page (or to a set of pages) of an e-book that is in use. As another example, the rendered content can include metadata content, representing for example, graphical images of e-books or other content items (e.g., music albums) that are associated with a particular device.

While the content is rendered, a front light trigger can be detected (420). The front light trigger can be implemented as an e-book marker, which can, for example, correspond to a programmatically generated trigger, such as a software implemented trigger that is associated with a condition or event of an e-book (or e-book activity) (422). As such, e-book marker is a trigger that is associated with, for example, a particular e-book (e.g., a user selects a particular e-book, or starts reading a new e-book), a page of an e-book, a section of an e-book, individual words (e.g., a particular word is present on a page of an e-book), and/or activities performed by the user in connection with rendered content of the e-book (e.g., the user puts a placeholder on a particular page while searching).

As an alternative or addition, the front light trigger can correspond to a sensor event (424). The sensor event can correspond to a particular sensor reading, such as provided by a temperature or ambient light sensor or of the e-reader device 110. The sensor interface 318 can, for example, provide sensor readings to the front light control component 316, which in turn interprets the sensor readings as triggers.

As another alternative or addition, the front light trigger can be specified by user input or settings. For example, user input can trigger the change in the front light. The user input can also specify a change in state of the front light. Still further, the user input can provide a setting which specifies a condition or event which is to generate a front light control output to after the state of the LEDs 209A, 209B. In some implementations, the user input can specify a front light effect for a particular reading session. Still further, the user input can define one or more programmatic triggers that are to cause a particular front light effect. In an example of FIG. 3, the user input for pre-defining the triggers can be provided through the front light interface 329, and stored with the data store 319.

Once the trigger is detected or otherwise provided, the front light can be controlled in a manner that is determined by the detected trigger (430). In an example of FIG. 3, the control component 316 outputs a control signal to change a state of the front light (e.g., illuminate the front light, and/or illuminate the front light with a particular color or other characteristic). The input trigger can be correlated to the state of the front light based on a predetermined correlation and/or data embedded in the trigger. In this way, the front light can be controlled for color (432), effect (434) (such as blinking, fading, blinking in a pattern, etc.), and/or timing (436) (e.g., the duration in which the state being signaled is to last).

EXAMPLES

FIG. 5A through FIG. 5D illustrate examples of an e-book device that can vary a state of illumination for light that is cast on its display screen, according to one or more embodiments. In particular, FIG. 5A through FIG. 5D illustrate an e-book device 500, in accordance with examples such as provided by FIG. 1, FIG. 2A, FIG. 2B. FIG. 2C and FIG. 3, having a display screen 510 on which illumination from an independent source such as a front light is provided.

Figure 5A:
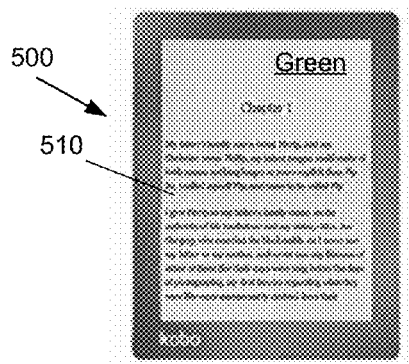
FIG. 5A through FIG. 5D illustrate examples of an e-book device that can vary a state of illumination for light that is cast on its display screen, according to one or more embodiments.
Figure 5B:
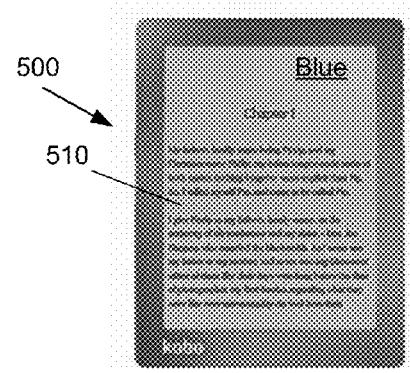
Figure 5C:
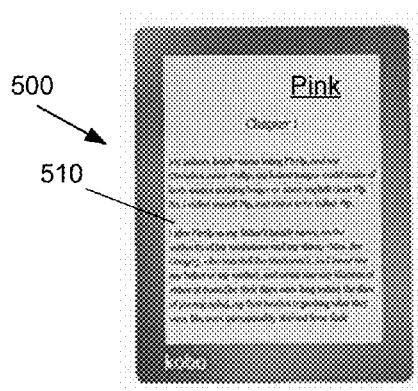
Figure 5D:
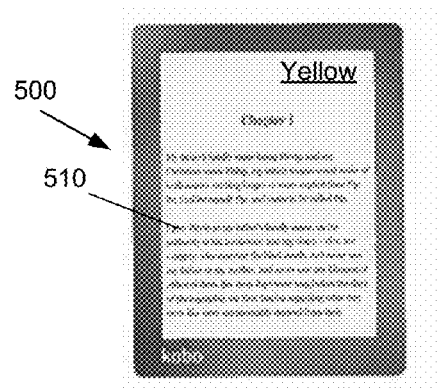

In examples of FIG. 5A through FIG. 5D, the state of illumination provided by, for example, the front light (not shown in FIG. 5A through FIG. 5D) is changed to reflect different colors. Thus, the color state of the illumination can vary, for example, between green (FIG. 5A), blue (FIG. 5B), pink (FIG. 5C) and yellow (FIG. 5D). In one example, the front light can be illuminated in response to a first event or condition. As an alternative or variation, the front light can be illuminated and then changed in color or other appearance. By way of illustration, the change in color to the front light can reflect (i) a progress of the user in reading the e-book (e.g., the portion of the e-book that the user is completed), (ii) a preference or setting of the user, (iii) the occurrence of a particular page or portion of the e-book being rendered, (iv) a direct input from the user specifying a particular color or state for the front light, and/or (v) an environmental or exterior condition, such as time of day (e.g., nighttime may be blue etc.) or temperature of the environment.

While some examples provide for the front light to after the color of the illumination, other implementations may change the warmth of the illumination. For example, cold illumination may refer to light that includes more white, creating a starker contrast. The illumination provided on the display 510 can vary between cold and warm depending on, for example, temperature or time of day. Numerous examples of described herein as to triggers can after the state of the front light, in addition to those provided with FIG. 5A through FIG. 5D.

Furthermore, numerous examples are described herein in the context of e-books and even reading activities. While such examples may employ display assemblies (e.g., electronic paper type displays) that have specific benefit from an independent or separate illumination component, other examples described herein provide for the use of illumination components for other kinds of computing devices, such as those devices was generate content through an LCD or LED type display. Still further, the use of independent illumination components that can change states can be applied to mechanical surfaces and features of competing devices, including those that employ keyboards, button sets or touch surfaces. Thus, for example, the front light components described with various examples can illuminate or cast light on to hardware features, such as keyboards.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A computing device comprising:
   a housing;
   a display screen;
   a multi-colored set of illumination elements that is configured to illuminate at least a portion of the display screen;
   a memory that stores a set of instructions; and
   one or more processors that use instructions stored in the memory to:
      render content from an e-book on the display screen;
      detect one or more pre-determined illumination triggers that include at least a detection of (i) a rendering of a first content within one of a plurality of portions of the content from the e-book, and (ii) a proportion of the content of the e-book that has been viewed;
      select a color based on the detected one or more pre-determined illumination triggers, wherein the color is selected based at least on an amount of the content of the e-book that has been viewed in proportion to an entirety of the content of the e-book; and
      illuminate the display screen in the selected color using the multi-colored set of illumination elements,
   wherein the housing forms a bezel over the display screen, and wherein the multicolored set of illumination elements are disposed in the bezel to illuminate the display screen.

2. The computing device of claim 1, wherein the multi-colored set of illumination elements correspond to a red-green-blue-white ("RGBW") set of light emitting diodes.

3. The computing device of claim 1, wherein the one or more processors detect the one or more pre-determined illumination triggers by detecting a progress of the user in reading the e-book.

4. The computing device of claim 1, wherein the e-book is associated with individual markers, each marker being associated with a location within the e-book, and wherein the one or more processors select the color based on a marker that is associated with a given portion of the e-book that is rendered.

5. The computing device of claim 1, further comprising one or more sensors for sensing a condition of an environment of the computing device, and wherein the one or more processors select the color based on an input from the one or more sensors.

6. The computing device of claim 5, wherein the condition corresponds to either an ambient light condition or to a temperature of the environment.

7. The computing device of claim 1, wherein the one or more processors detect the one or more pre-determined illumination triggers based on a user-specified condition.

8. The method of claim 1, wherein the one or more pre-determined illumination triggers further include a detection of (iii) a subject matter identified by words or phrases in at least a portion of the content that is being displayed, and wherein the one or more processors use the instructions stored in the memory to:
   select a first color when a first subject matter is identified;
   select a second color when a second subject matter is identified; and
   illuminate the display screen in the first color and/or the second color by casting a light on the display screen via the multi-colored set of illumination elements.

9. The method of claim 1, wherein the one or more processors use the instructions stored in the memory to:
   select a first color when a first amount of the content of the e-book has been viewed; and
   select a second color when a second amount of the content of the e-book has been viewed, wherein the first color is different from the second color, and wherein the first amount of the content is different from the second amount of the content.

10. A computing device comprising:
    a housing;
    a display screen;
    a multi-colored set of illumination elements positioned to illuminate at least a portion of the display screen;
    a memory that stores a set of instructions; and
    one or more processors that use instructions in the set of instructions to control illumination of the display screen in multiple colors using the multi-colored set of illumination elements, including triggering illumination of the multi-colored set of illumination elements in at least a first color at a first instance based on one or more predetermined illumination triggers that include at least a detection of (i) a rendering of a first content within one of a plurality of portions of content from an e-book, and (ii) a proportion of the content of the e-book that has been viewed, and illumination of the multi-colored set of illumination elements in at least a second color at a second instance,
    wherein the first color is selected from a set of colors based at least on an amount of the content of the e-book that has been viewed in proportion to an entirety of the content of the e-book, and wherein the housing forms a bezel over the display screen, and wherein the multicolored set of illumination elements are disposed in the bezel to illuminate the display screen.

11. The computing device of claim 10, wherein the multicolored set of illumination elements correspond to a red-green-blue-white ("RGBW") set of light emitting diodes.

12. The computing device of claim 10, wherein the one or more processors implement logic to select a color of illumination from the set of multi-colored set of illumination elements.

13. The computing device of claim 12, wherein the one or more processors operate to display at least a portion of the e-book, and wherein the one or more processors implement the logic to detect a current reading position of the user in the e-book that is being rendered, then select the color based on the current reading position of the user.

14. The computing device of claim 10, further comprising one or more sensors for sensing a condition of an environment of the computing device, and wherein the one or more processors implement logic to select the color based on an input from the one or more sensors.

15. The computing device of claim 14, wherein the condition corresponds to either an ambient light condition or to a temperature of the environment.

16. The computing device of claim 10, wherein the one or more processors implement logic to select a color of illumination from the set of multi-colored set of illumination elements based on a pre-associated marker provided in a rendered location of the e-book.

17. A method for operating a computing device, the method comprising:

detecting one or more pre-determined illumination triggers for a front light of the computing device, wherein the front light includes a multi-colored set of illumination elements that is configured to illuminate at least a portion of a display screen of the computing device, and wherein the one or more pre-determined illumination triggers include at least a detection of (i) a rendering of a first content within one of a plurality of portions of content from an e-book, and (ii) a proportion of the content of the e-book that has been viewed;

selecting a state for the front light based on the detected one or more pre-determined illumination triggers, wherein the state for the front light is selected based at least on an amount of the content of the e-book that has been viewed in proportion to an entirety of the content of the e-book; and controlling the front light to change into the selected state, wherein the computing device includes a housing that forms a bezel over the display screen, and wherein the multi-colored set of illumination elements are disposed in the bezel to illuminate the display screen.

18. The method of claim 17, wherein controlling the front light to change into the selected state includes controlling the front light to change into a particular color.

19. The method of claim 17, wherein controlling the front light to change into the selected state includes controlling the front light to change luminosity and/or lighting affect.

20. The method of claim 17, wherein detecting one or more pre-determined illumination triggers includes detecting one or more triggers in connection with rendering the e-book.

* * * * *